(12) United States Patent
Marciquet et al.

(10) Patent No.: US 8,540,432 B2
(45) Date of Patent: Sep. 24, 2013

(54) DISENGAGEABLE AXIAL ABUTMENT

(75) Inventors: Charles Marciquet, Irreville (FR);
Laurent Collongeat, Vernon (FR);
Philippe Bourdin, Saint Just (FR);
Patrice Fonteyn, Vernon (FR)

(73) Assignee: Snecma, Paris (FR)

( * ) Notice: Subject to any disclaimer, the term of this patent is extended or adjusted under 35 U.S.C. 154(b) by 161 days.

(21) Appl. No.: 13/256,320

(22) PCT Filed: Mar. 1, 2010

(86) PCT No.: PCT/FR2010/050344
§ 371 (c)(1),
(2), (4) Date: Sep. 13, 2011

(87) PCT Pub. No.: WO2010/106264
PCT Pub. Date: Sep. 23, 2010

(65) Prior Publication Data
US 2012/0020604 A1 Jan. 26, 2012

(30) Foreign Application Priority Data

Mar. 16, 2009 (FR) ...................................... 09 51634

(51) Int. Cl.
*F16C 21/00* (2006.01)
*F16C 33/60* (2006.01)
*F16C 33/66* (2006.01)

(52) U.S. Cl.
USPC ............................ 384/517; 384/101; 384/505

(58) Field of Classification Search
USPC ................. 384/101, 500, 501, 502, 505, 506, 384/517, 518, 519; 415/33, 34, 110, 111, 415/132, 142, 170.1, 180, 229
See application file for complete search history.

(56) References Cited

U.S. PATENT DOCUMENTS

| | | | | |
|---|---|---|---|---|
| 2,344,571 | A * | 3/1944 | Turrettini | 384/101 |
| 4,131,400 | A * | 12/1978 | Segerstrom | 418/203 |
| 4,538,960 | A | 9/1985 | Iino et al. | |
| 5,232,334 | A * | 8/1993 | Mechin et al. | 415/113 |
| 7,686,572 | B2 * | 3/2010 | Wahl et al. | 415/26 |
| 8,157,502 | B2 * | 4/2012 | Edeline et al. | 415/111 |
| 2002/0181818 | A1 | 12/2002 | Bridges | |

FOREIGN PATENT DOCUMENTS

| | | |
|---|---|---|
| FR | 2698666 | 6/1994 |
| FR | 2698667 | 6/1994 |
| FR | 2915535 | 10/2008 |
| JP | 2003-172341 | 6/2003 |

* cited by examiner

*Primary Examiner* — Phillip A Johnson
(74) *Attorney, Agent, or Firm* — Preti Flaherty Beliveau & Pachios LLP

(57) ABSTRACT

In a disengageable axial abutment for a rotary machine fitted with fluid bearings, an outer ring (103) comprises first and second outer half-rings (103A, 103B) centered in the casing (111) by a flexible suspension system, with the outer half-rings (103A, 103B) being held in the axial direction between a static abutment member (113) and a pre-loading system (104) exerting a predetermined axial force such that, so long as the axial load exerted on the axial abutment via a synchronization cone (108) is greater than a given threshold, each rolling element (101) presents a single line (121) of two points of contact (121A, 121B) with an inner ring (102) and with the first outer half-ring (103A) respectively, and the inner ring (102) is driven in rotation by the synchronization cone (108), whereas, when the axial load exerted on the axial bearing becomes smaller, a gap (115) is created between the outer half-rings (103A, 103B) and a second line (123) of two additional points of contact (123A, 123B) is created between each rolling element (101) and the inner ring (102) and the second outer half-ring (103B) respectively, such that the axial abutment is disengaged.

7 Claims, 2 Drawing Sheets

DISENGAGEABLE AXIAL ABUTMENT

FIELD OF THE INVENTION

The present invention relates to a disengageable axial abutment for a rotary machine fitted with fluid bearings, the abutment comprising an inner ring arranged around a rotary shaft without radial interference on said shaft, a synchronization cone mounted on the rotary shaft to provide selective rotary drive of the inner ring, an outer ring mounted in a casing via a flexible suspension system, and oblique-contact rolling elements.

PRIOR ART

In the context of rotary machines mounted on radial fluid bearings, disengageable axial abutments are already known, such as those shown in FIG. 4, that serve to take up residual axial forces.

In particular, cryogenic rotary machines have been developed on fluid bearings in which one of the major advantages is a lifetime that is long compared with machines on conventional ball or roller bearings, which are confronted with wear problems given the impossibility of delivering the necessary lubrication under cryogenic conditions.

The construction on fluid bearings requires an element to take up residual axial forces, in particular during a transient stage in machines having an active axial balancing system that is operative under steady conditions.

FIG. 4 shows an example of a known axial abutment with releasable balls that is used in rotary machines fitted with radial fluid bearings.

In FIG. 4, there can be seen one of the rolling elements 1 constituted by balls held captive in a cage 12 and interposed between an inner ring 2 and an outer ring 3.

The inner ring 2 is mounted with clearance 7 on a main shaft 10, 14 and is capable of being driven in rotation with the shaft 10, 14 by means of a synchronization cone 8. Rotation of the inner ring 2 is stopped by the ring making contact with a stator abutment element 6. The outer ring 3 is mounted relative to a casing 11 in such a manner as to be capable of sliding relative thereto. The outer ring 3 is capable of co-operating with a flexible centering wire 5 acting as a damper that is interposed between the outer ring 3 and the casing 11, and with a system 4 for pre-loading the bearing, which system may comprise a spring acting axially on the outer ring 3.

The pre-loaded ball bearing with oblique contact as shown in FIG. 4 defines a disengageable axial abutment in which each ball has two points of contact, respectively with the inner ring 2 and with the outer ring 3.

The disengageable axial abutment of FIG. 4 presents drawbacks because of the need for the outer ring 3 to slide and because of the sudden impact of the inner ring 2 against the stator abutment 6 during release, thereby heating the bearing and the stator abutment 6, causing the balls 1 to slip, and subjecting the balls 1, the rings, 2, 3, and the stator bearing 6 to wear.

Document US 2002/0181818 A1 discloses an emergency bearing for a rotary machine having magnetic bearings, such a disengageable bearing comprising balls held between an inner ring and two outer half-rings that are themselves held in the axial direction between a rigid abutment member (actuator) and a pre-loading system. The disengaging system is active in the sense that it requires the presence of actuators that thrust the emergency bearing against the rotating shaft via a cone.

Document JP 2003-172341-A also describes an axial bearing with three-stress balls capable of including two outer half-rings or two inner half-rings that are subjected to rigid pre-loading.

DEFINITION AND OBJECT OF THE INVENTION

The invention seeks to remedy the above-mentioned drawbacks and in particular to avoid sudden release of an axial abutment together with the associated internal friction.

The invention also seeks to avoid any need for an outer ring to slide together with the associated risks of fretting, of poor sliding, and of jamming.

In general, the invention seeks to increase the lifetime of a disengageable axial abutment installed in a rotary machine fitted with fluid bearings.

In accordance with the invention, these objects are achieved by a disengageable axial abutment for a rotary machine fitted with fluid bearings, the abutment comprising an inner ring arranged around a rotary shaft without radial interference on said shaft, a synchronization cone mounted on the rotary shaft to provide selective rotary drive of the inner ring, an outer ring mounted in a casing via a flexible suspension system, and oblique-contact rolling elements, the abutment being characterized in that the outer ring comprises first and second outer half-rings that are centered relative to the casing by said flexible suspension system, and in that the first and second outer half-rings are held in the axial direction between firstly a static abutment member and secondly a flexible pre-loading system exerting an axial force that is predetermined so that so long as the axial load exerted on the axial abutment via the synchronization cone is greater than a given threshold, each of the rolling elements presents a single line of two points of contact respectively with the inner ring and with the first outer half-ring, and the inner ring is driven in rotation by said synchronization cone, whereas when the axial load exerted on the axial abutment becomes smaller, a gap is created between the first and second outer half-rings and a second line of two additional points of contact is created between each of the rolling elements and by respectively the inner ring and the second outer half-ring, such that the axial abutment is disengaged, with the inner ring being stopped from rotating by inertia and friction internal to the abutment via the four points of contact between each rolling element and the inner ring and the first and second outer half-rings.

Preferably, the clearance between the first and second outer half-rings and the casing is greater than 100 micrometers.

The disengageable axial abutment of the invention is advantageously applied to a cryogenic rotary machine, and more particularly to such a machine fitted with an active axial balancing system that is operative under steady conditions.

Depending on the operating stage, the axial abutment of the invention presents two or four points of contact per rolling element via the two variably-spaced outer half-rings, thereby making it possible to limit the length of time the axial bearing operates with the inner ring engaged with the rotary shaft solely to transient stages in which the system that provides active axial balancing under steady conditions is not yet active, which corresponds to a few seconds in each cycle. Furthermore, the concept of four points of contact optimizes lifetime by minimizing the risk of the various internal and external elements being subjected to wear, in particular since it is no longer necessary to have recourse to a stator axial abutment in order to brake the inner ring.

BRIEF DESCRIPTION OF THE DRAWINGS

Other characteristics and advantages of the invention appear from the following description of particular embodiments given as examples with reference to the accompanying drawings, in which.

DETAILED DESCRIPTION OF PREFERRED EMBODIMENTS

Figure 1:
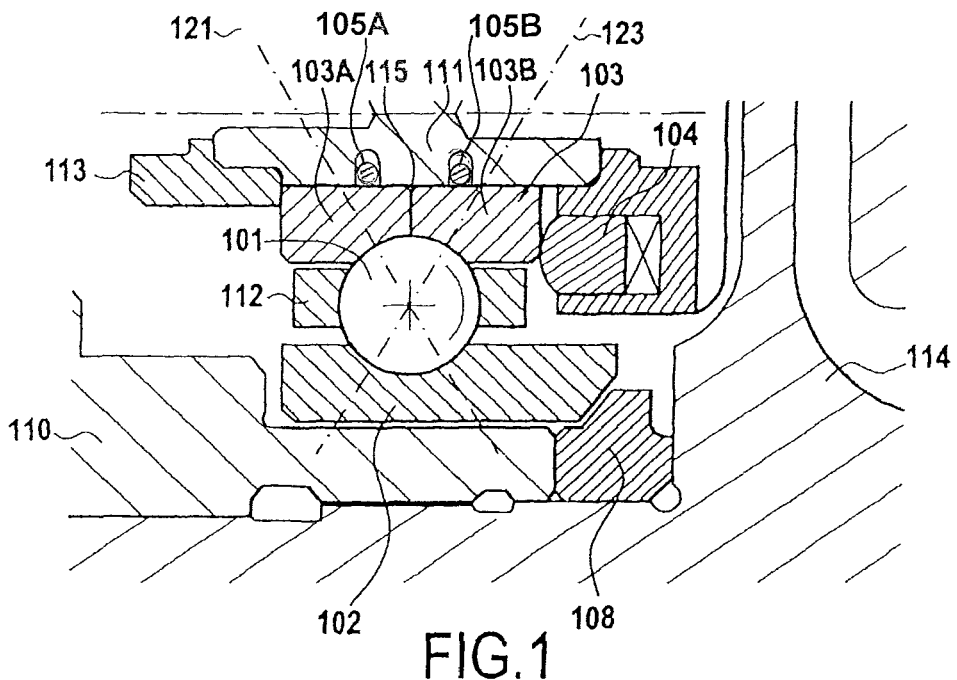
FIG. 1 is an axial half-section view of an example of a disengageable axial abutment of the invention.

FIG. 1 shows an example of a disengageable axial abutment of the invention that, depending on operating conditions, may present either two or four points of contact between a rolling element and the inner and outer rings.

The axial abutment of FIG. 1 comprises an inner ring 102 that is mounted on a central shaft 110, 114 without radial interference, which shaft may for example be secured to an impeller of a cryogenic rotary machine. The central shaft 110, 114 is advantageously mounted on conventional fluid bearings (not shown in the drawing) and the rotary machine is advantageously fitted with an active axial balancing system that is operative under steady conditions.

Examples of active axial balancing systems are described for example in patent documents FR 2 698 666, FR 2 698 667, and FR 2 915 535.

The inner ring 102 is driven in rotation by a synchronization cone 108.

The axial abutment of FIG. 1 includes rolling elements 101, such as balls, held in a cage 112 and arranged between the inner ring 102 and an outer ring 103 made up of two portions 103A and 103B.

The elements 103A and 103B of the outer ring 103 are centered on a casing 111 by a flexible suspension system 105A, 105B such that the clearance between the outer ring 103 and the casing 111 is preferably greater than 100 micrometers. The elements 103A and 103B may also be merely fitted within the casing 111 with some minimum residual clearance that is preferably greater than 100 micrometers.

Figure 2:
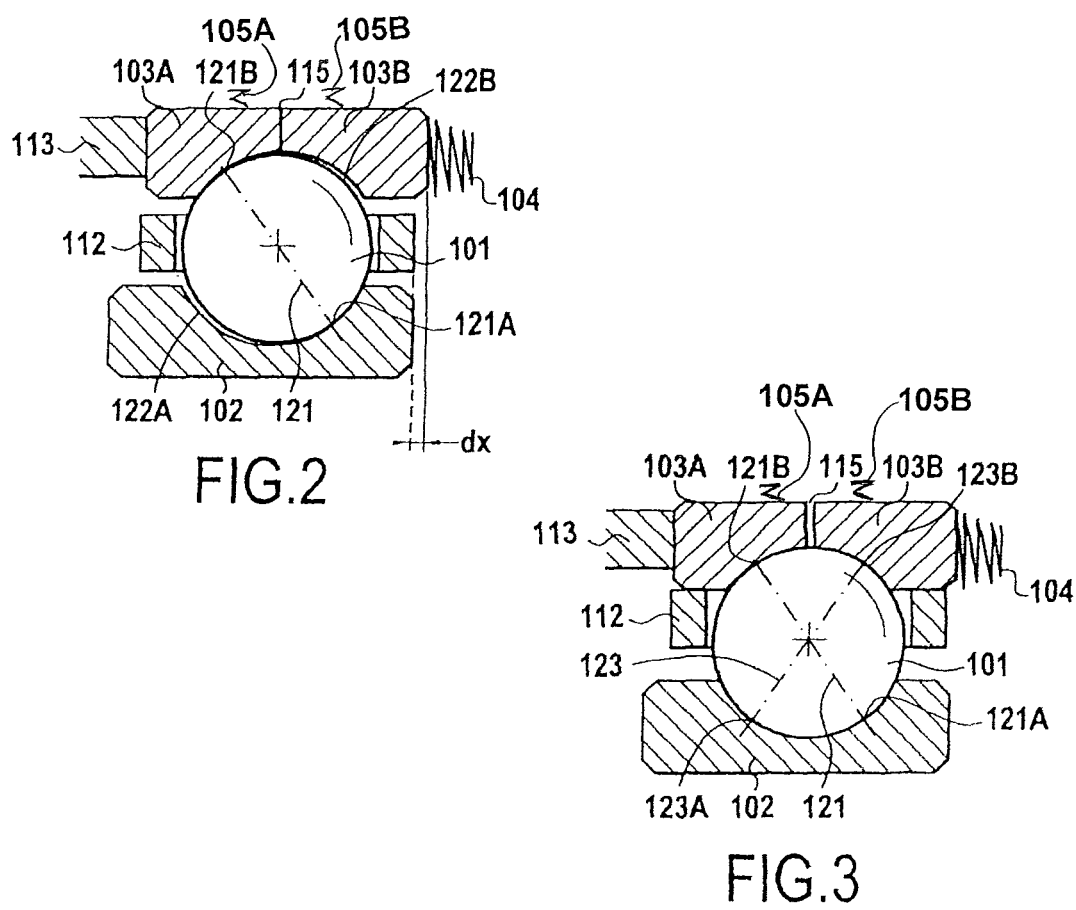
FIG. 2 is a fragmentary view of FIG. 1 during a transient stage with two points of contact between a rolling element and inner and outer rings.

The outer half-rings 103A and 103B are clamped in the axial direction between firstly a static abutment member 113 secured to the casing 111 and secondly a pre-loading system 104, such as a spring, that exerts a predetermined axial force, e.g. of the order of a few hundreds of newtons, such that so long as the axial load exerted on the axial bearing is greater than a given threshold (e.g. of the order of a few thousands of newtons), which threshold depends on the speed of rotation, each of the rolling elements 101 presents a single line 121 with two points of contact 121A and 121B, firstly with the inner ring 102 and secondly with the first outer half-ring 103A. Under such circumstances, the inner ring 102 is driven in rotation by the synchronization cone 108, and the two outer half-rings 103A and 103B are kept in contact against each other by the pre-loading 104 so the gap 115 is zero, as shown in FIG. 2, where it can be seen that the inner ring 102 is offset a little axially by an amount dx relative to the two outer half-rings 103A and 103B which are in contact with each other. Under such circumstances, a ball 101 is in contact at point 121A with the inner ring 102 and at point 121B with the outer half-ring 103A on an oblique line of contacts 121. In contrast, along a second oblique line between the outer half-ring 103B and the inner ring 102, the contacts are released in a zone 122A between a ball 101 and the inner ring 102, and in a zone 122B between the ball 101 and the outer half-ring 103B.

Figure 3:
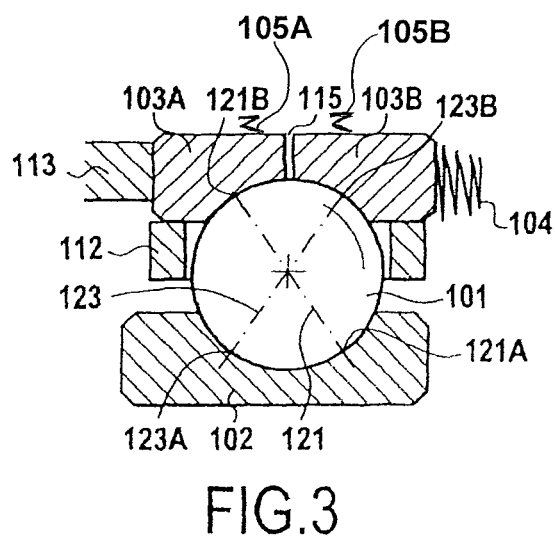
FIG. 3 is a fragmentary view of FIG. 1 during a stage under steady conditions with four points of contact between a rolling element and inner and outer rings.
Figure 4:
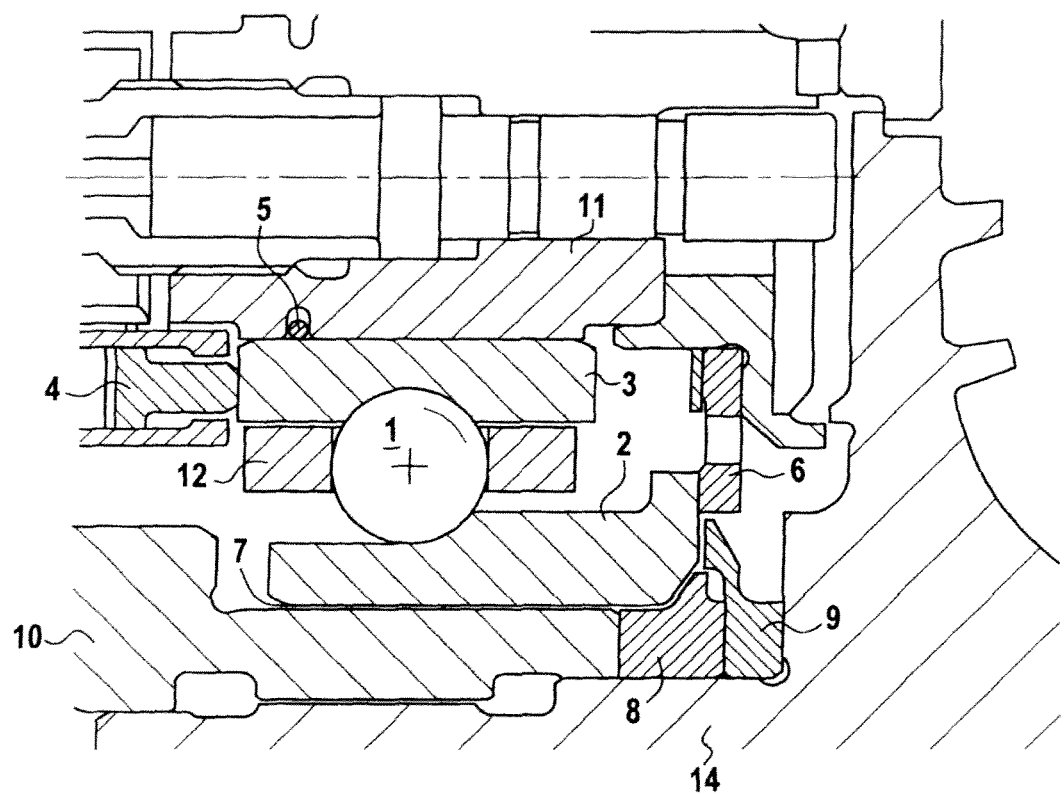
FIG. 4 is an axial half-section view of an example of a prior art disengageable axial abutment.

When the axial load exerted on the axial abutment becomes less than a given threshold, the reduction in the axial offset generates a gap 115 of non-zero value between the outer half-rings 103A and 103B, and as a result a second line 123 of two additional points of contact 123A and 123B is created between each of the balls 101 and the inner ring 102 and the outer half-ring 103B respectively (see FIG. 3). Under such circumstances, the axial abutment is released, with the inner ring 102 being stopped from rotating by inertia and by friction internal to the abutment via the four points of contact between each ball 101 and the inner ring 102 and the outer half-rings 103A and 103B.

The disengageable axial abutment of the invention that presents either two or four points of contact, depending on operating conditions, includes an outer ring 103 made up of two half-rings 103A and 103B that remain in the housing defined between the thrust part 113 and the pre-load 104 without requiring any sliding, and with only the half-ring 103B presenting a very small amount of movement in the axial direction against the action of the flexible pre-loading 104 when a gap or clearance 115 is created (FIG. 3), as happens whatever the residual axial force exerted on the axial bearing at the end of transient conditions drops below a predetermined threshold.

Thus, during a starting stage and so long as the axial load associated with the transient stage is greater than the threshold force, which force depends on the speed of rotation (by the centrifugal effect on the balls 101), there exists a single oblique line of contacts 121 between the balls 101 and the rings 102 and 103 (FIG. 2). The advantage of operating in this way is that it minimizes the power that is dissipated via the contacts 121A and 121B and minimizes the resulting wear due to the ball bearing operating in conventional manner. The axial abutment takes up the axial thrust and its speed varies. The pre-loading force exerted by the spring 104 puts the two outer half-rings 103A and 103B into contact and releases the contacts in the zones 122A and 122B (FIG. 2).

The gap 115 corresponding to this transient stage is zero. In the rest state, the gap 115 must therefore remain less than a maximum value that enables the opposite contacts in the zones 122A and 122B to be released. This maximum value corresponds to the offset of the bearing under the loading plus the flattening of the outer half-ring 103B under pre-loading, and account must also be taken of centrifugal force.

When the axial force becomes less than the threshold force, a second line of contact 123 is created between the balls 101 and the rings 102, 103 by varying the contact angles of the axial abutment.

Thus, after a stage of starting and of transient operation, the residual axial force drops as a result of the active axial balancing system coming into operation, thereby leading to the shaft 110 being offset axially and in the end releasing the connection between the axial abutment and the cone 108, after which the inner ring 102 is stopped from rotating by the friction internal to the abutment as its contacts change progressively from the two contacts 121A and 121B of FIG. 2 to three contacts with the addition of a third contact 123B between a ball 101 and the pre-loaded outer half-ring 103B, and then four contacts with the further addition of a fourth contact 123A between a ball 101 and the inner ring 102. This causes the inner ring 102 to come to rest gently.

While the axial abutment is operating with four zones of contact 121A, 121B, 123A, and 123B (FIG. 3), the bearing is no longer loaded and it is no longer driven in rotation, which corresponds to a release stage. This system keeps the bearing well positioned axially.

The clearance or gap 115 between the outer half-rings 103A and 103B during the stage of operation with four zones of contact present a value that is greater than a minimum value enabling the outer half-rings 103A and 103B to move under the effect of the pre-loading 104 without there being contact between these two half-rings.

The invention claimed is:

1. A disengageable axial abutment for a rotary machine fitted with fluid bearings, the abutment comprising an inner ring arranged around a rotary shaft without radial interference on said shaft, a synchronization cone mounted on the rotary shaft to provide selective rotary drive of the inner ring, an outer ring mounted in a casing via a flexible suspension system, and oblique-contact rolling elements, the abutment being characterized in that the outer ring comprises first and second outer half-rings that are centered relative to the casing by said flexible suspension system, and in that the first and second outer half-rings are held in the axial direction between firstly a static abutment member and secondly a flexible pre-loading system exerting an axial force that is predetermined so that so long as the axial load exerted on the axial abutment via the synchronization cone is greater than a given threshold, each of the rolling elements presents a single line of two points of contact respectively with the inner ring and with the first outer half-ring, and the inner ring is driven in rotation by said synchronization cone, whereas when the axial load exerted on the axial abutment becomes smaller, a gap is created between the first and second outer half-rings and a second line of two additional points of contact is created between each of the rolling elements and respectively the inner ring and the second outer half-ring, such that the axial abutment is disengaged, with the inner ring being stopped from rotating by inertia and by friction internal to the abutment via the two points of contact and the two additional points of contact between each rolling element and the inner ring and the first and second outer half-rings.

2. The disengageable axial abutment according to claim 1, characterized in that the pre-loading system comprises a spring.

3. The disengageable axial abutment according to claim 2, characterized in that:
    a clearance between the first and second outer half-rings and the casing is greater than 100 micrometers;
    the rolling elements are balls;
    the disengageable axial abutment is applied to a cryogenic rotary machine; and
    the disengageable axial abutment is applied to a cryogenic rotary machine fitted with an active axial balancing system that is operative under steady conditions.

4. The disengageable axial abutment according to claim 1, characterized in that a clearance between the first and second outer half-rings and the casing is greater than 100 micrometers.

5. The disengageable axial abutment according to claim 1, characterized in that the rolling elements are balls.

6. The disengageable axial abutment according to claim 1, characterized in that the disengageble axial abutment is applied to a cryogenic rotary machine.

7. The disengageable axial abutment according to claim 6, characterized in that the disengageable axial abutment is applied to a cryogenic rotary machine fitted with an active axial balancing system that is operative under steady conditions.

* * * * *